(12) United States Patent
Watanabe et al.

(10) Patent No.: US 10,167,797 B2
(45) Date of Patent: Jan. 1, 2019

(54) CONTROL SYSTEM OF ENGINE

(71) Applicant: Mazda Motor Corporation, Aki-gun, Hiroshima (JP)

(72) Inventors: Tomomi Watanabe, Hiroshima (JP); Nobuo Takeuchi, Hiroshima (JP); Yuya Honda, Hiroshima (JP); Kazunori Hirabayashi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/170,869

(22) Filed: Jun. 1, 2016

(65) Prior Publication Data

US 2016/0356229 A1    Dec. 8, 2016

(30) Foreign Application Priority Data

Jun. 3, 2015  (JP) .................................. 2015-113184

(51) Int. Cl.
| F02D 41/06 | (2006.01) |
|---|---|
| F02D 41/40 | (2006.01) |
| F02D 41/02 | (2006.01) |
| F02D 41/30 | (2006.01) |

(52) U.S. Cl.
CPC ......... *F02D 41/064* (2013.01); *F02D 41/024* (2013.01); *F02D 41/3023* (2013.01); *F02D 41/402* (2013.01); *F02D 41/3029* (2013.01); *F02D 41/401* (2013.01); *Y02T 10/26* (2013.01); *Y02T 10/44* (2013.01)

(58) Field of Classification Search
CPC ..... F02D 41/064; F02D 41/024; F02D 41/401
See application file for complete search history.

(56) References Cited

U.S. PATENT DOCUMENTS

| 5,794,585 A | 8/1998 | Yonezawa et al. |
| 7,051,701 B2 * | 5/2006 | Tomita ................... F02D 37/02 |
| | | 123/295 |
| 7,171,953 B2 | 2/2007 | Altenschmidt |

(Continued)

FOREIGN PATENT DOCUMENTS

JP          2010150971 A       7/2010

*Primary Examiner* — Hieu T Vo
*Assistant Examiner* — Arnold Castro
(74) *Attorney, Agent, or Firm* — Alleman Hall Creasman & Tuttle LLP

(57) ABSTRACT

A control system of an engine is provided, which controls, by using a tumble flow, a behavior of fuel that is directly injected into a combustion chamber formed inside a cylinder of the engine. The control system includes a fuel injector for directly injecting the fuel into the combustion chamber, a tumble flow generator for generating the tumble flow within the combustion chamber, an ignition timing control module for controlling an ignition plug to ignite after a top dead center on compression stroke of the cylinder in a cold state of the engine, and a fuel injector control module for controlling the fuel injector to inject the fuel at an intake-stroke injection timing, a compression-stroke-early-half injection timing, and a compression-stroke-latter-half injection timing. The fuel injector control module controls the fuel injector to inject the fuel toward a vortex center of the tumble flow at the compression-stroke-early-half injection timing.

4 Claims, 13 Drawing Sheets

(56) References Cited

U.S. PATENT DOCUMENTS

| | | | | |
|---|---|---|---|---|
| 7,296,555 B2* | 11/2007 | Tamma | ............... | F02D 41/403 |
| | | | | 123/299 |
| 7,331,333 B2* | 2/2008 | Maitani | ............... | F02D 41/064 |
| | | | | 123/179.17 |
| 7,938,098 B2* | 5/2011 | Ashizawa | ............ | F02D 41/401 |
| | | | | 123/294 |
| 8,151,762 B2 | 4/2012 | Nishimoto et al. | | |
| 8,196,560 B2 | 6/2012 | Fujikawa et al. | | |
| 8,862,367 B2* | 10/2014 | Toyohara | ............ | F02D 41/247 |
| | | | | 123/478 |
| 2005/0161021 A1* | 7/2005 | Ishii | ...................... | F02D 37/02 |
| | | | | 123/305 |
| 2007/0062470 A1* | 3/2007 | Ashizawa | ............ | F02B 23/101 |
| | | | | 123/90.15 |
| 2015/0122219 A1* | 5/2015 | Kojima | ............... | F02D 41/402 |
| | | | | 123/305 |
| 2015/0211431 A1* | 7/2015 | Harada | ............... | F02B 17/005 |
| | | | | 123/295 |
| 2015/0252736 A1* | 9/2015 | Kurashima | ............ | F02D 15/02 |
| | | | | 123/294 |
| 2016/0040618 A1* | 2/2016 | Idogawa | ............ | F02D 41/3076 |
| | | | | 701/104 |
| 2016/0341145 A1* | 11/2016 | Yasuda | ............... | F02D 41/068 |
| 2016/0356229 A1* | 12/2016 | Watanabe | ............ | F02D 41/064 |
| 2016/0356230 A1* | 12/2016 | Watanabe | ............ | F02D 41/064 |
| 2017/0009698 A1* | 1/2017 | Tsugawa | ............... | F02D 41/401 |
| 2017/0082058 A1* | 3/2017 | Katakura | ............... | F02D 41/38 |
| 2017/0138293 A1* | 5/2017 | Moorcroft | ............ | F02D 41/008 |

* cited by examiner

CONTROL SYSTEM OF ENGINE

BACKGROUND

The present invention relates to a control system of an engine, particularly to a control system of an engine, which controls, by using a tumble flow, a behavior of fuel which is directly injected into a combustion chamber formed inside a cylinder of the engine.

In accordance with recent tightening of the exhaust gas restriction for automobiles, there has been a strong demand for improvement of fuel consumption as well as a purifying performance of exhaust gas discharged from an engine.

In exhaust paths of the automobiles, a redox catalyst for purifying unburned gas (e.g., HC, CO, and $NO_x$) contained within the exhaust gas of the engine is provided. In order to purify the unburned gas by this catalyst, it is necessary to maintain a temperature of the catalyst at its activating temperature or above.

Therefore, if a temperature of the exhaust gas is low and the temperature of the catalyst has not reached the activating temperature, which is the case, for example, immediately after a cold start of the engine, the temperature of the catalyst needs to be increased promptly so as to secure the purifying performance of the exhaust gas.

Therefore, retarding an ignition timing to after a top dead center on compression stroke (CTDC) immediately after the cold start in which the temperature of the catalyst is low, so as to cause high-temperature exhaust gas to flow into the catalyst and increase the temperature thereof, has been discussed. However, in this case, the retarding of the ignition timing to after the CTDC causes a temperature and pressure drop inside a combustion chamber of the engine, and thus, ignition stability degrades and even if the ignition can be performed successfully, flame propagation becomes poor. Therefore, with a spark-ignition direct-injection engine disclosed in JP2010-150971A, in a cold state of the engine, fuel is injected in two injections on intake stroke and in a latter half of compression stroke, and the fuel for the latter half of the compression stroke is injected to collide with a top surface and/or a cavity of a piston of the engine. Thus, a rich atmosphere is formed around the ignition plug at the ignition timing, and the ignition stability and the flame propagation (combustion stability) are improved.

However, with the conventional spark-ignition direct-injection engine described above, when the fuel injected in the latter half of the compression stroke collides with the top surface and/or the cavity of the piston, part of the fuel adheres to the piston. Such fuel adhesion to the piston degrades the fuel consumption and also increases smoke and hydrocarbons (HC) (unburned gas) contained within the exhaust gas, which degrades emission performance.

Further, if a fuel injection amount in the latter half of the compression stroke is reduced to suppress the fuel adhesion to the piston, the rich atmosphere cannot sufficiently be formed around the ignition plug at the ignition timing after the CTDC, and the combustion stability degrades.

SUMMARY

The present invention is made in view of solving the issues of the conventional art described above, and aims to provide a control system of an engine, which is capable of improving combustion stability while suppressing adhesion of fuel to a piston to prevent degradation of an emission performance.

According to one aspect of the present invention, a control system of an engine is provided, which controls, by using a tumble flow, a behavior of fuel that is directly injected into a combustion chamber formed inside a cylinder of the engine. The control system includes a fuel injector for directly injecting the fuel into the combustion chamber, a tumble flow generator for generating the tumble flow within the combustion chamber, an ignition timing control module for controlling an ignition plug of the engine to ignite after a top dead center on compression stroke of the cylinder in a cold state of the engine, and a fuel injector control module for controlling the fuel injector to inject the fuel at an intake-stroke injection timing designed to be on intake stroke of the cylinder, a compression-stroke-early-half injection timing designed to be in an early half of the compression stroke, and a compression-stroke-latter-half injection timing designed to be in a latter half of the compression stroke. The fuel injector control module controls the fuel injector to inject the fuel toward a vortex center of the tumble flow at the compression-stroke-early-half injection timing.

With the above configuration, the ignition timing control module retards the ignition timing to after the top dead center on the compression stroke in the cold state so as to achieve a prompt warm-up of a catalyst. Also, the fuel injector control module controls the fuel injector to inject the fuel at the intake-stroke injection timing, the compression-stroke-early-half injection timing, and the compression-stroke-latter-half injection timing in the cold state, and inject the fuel toward the vortex center of the tumble flow at the compression-stroke-early-half injection timing. Therefore, at the compression-stroke-early-half injection timing, a penetration of the fuel in its direction of injection by the fuel injector is suppressed by a kinetic energy of the tumble flow oriented in a direction perpendicular to the injection direction of the fuel. Thus, a rich area can be formed within the tumble flow without the fuel penetrating the tumble flow and adhering to a crown surface of a piston and a wall surface of the combustion chamber. Further, the rich area is shifted in position along the tumble flow and, by the fuel injection at the compression-stroke-latter-half injection timing, pushed toward the ignition plug. Thus, at the ignition timing designed to be after the top dead center on the compression stroke, the rich area can be formed around the tip of the ignition plug with the fuel injected at the compression-stroke-latter-half injection timing, and as a result, combustion stability can be improved. Moreover, by splitting the fuel injection timing on the compression stroke into the compression-stroke-early-half injection timing and the compression-stroke-latter-half injection timing, the fuel injection amount at the compression-stroke-latter-half injection timing is reduced, and thus, the fuel adhesion to the crown surface can be suppressed. Therefore, even when the ignition timing is designed to be after the top dead center on the compression stroke so as to promptly warm up the catalyst, the combustion stability can be improved while suppressing the fuel adhesion to the crown surface and the wall surface of the combustion chamber to prevent degradation of an emission performance.

Further, the tumble flow generator may be an intake port of the engine. The ignition plug of the engine may be provided in a center portion of a ceiling of the combustion chamber. The fuel injector may be disposed at a position of a circumferential edge portion of the ceiling of the combustion chamber on a side where the intake port is provided, and inject the fuel obliquely downward and toward an opposite side from the intake port. The engine may have a piston having a crown surface, and the crown surface may be formed with an inclined surface extending obliquely upward and toward the side where the fuel injector is provided, from an end portion of the crown surface on an opposite side from the fuel injector.

With the above configuration, the crown surface is formed with the inclined surface extending obliquely upward and toward the side where the fuel injector is provided, from the end portion of the crown surface on the opposite side from the fuel injector. Therefore, the tumble flow oriented obliquely upward and toward the fuel injector can be generated along the inclined surface of the crown surface, and the fuel can surely be injected toward the vortex center of the tumble flow by the fuel injector. Thus, the rich area can be formed within the tumble flow without the fuel penetrating the tumble flow and adhering to the crown surface and the wall surface of the combustion chamber, and at the ignition timing designed to be after the top dead center on the compression stroke, the rich area can be formed around the tip of the ignition plug with the fuel injected at the compression-stroke-latter-half injection timing, and as a result, the combustion stability can be improved.

Further, the compression-stroke-early-half injection timing may be designed to be a timing at which a range of a center axis of the combustion chamber intersecting with an extension of an injection range of the fuel injected by the fuel injector at a predetermined spread angle is located above a position of the center axis intersecting with an extension plane of the inclined surface of the crown surface.

With the above configuration, since the fuel injector control module injects the fuel to a range above a lower section of the tumble flow oriented obliquely upward and toward the fuel injector along the inclined surface of the crown surface at the compression-stroke-early-half injection timing, the fuel can surely be injected toward the vortex center of the tumble flow. Thus, the rich area can be formed within the tumble flow without the fuel penetrating the tumble flow and adhering to the crown surface and the wall surface of the combustion chamber, and at the ignition timing designed to be after the top dead center on the compression stroke, the rich area can be formed around the tip of the ignition plug with the fuel injected at the compression-stroke-latter-half injection timing, and as a result, the combustion stability can be improved.

Further, the compression-stroke-early-half injection timing may be designed to be between 160 and 110 degrees before the top dead center of the compression stroke.

With the above configuration, the injection timing is designed to be a timing at which the fuel can surely be injected toward the vortex center of the tumble flow. Thus, the rich area can be formed within the tumble flow without the fuel penetrating the tumble flow and adhering to the crown surface and the wall surface of the combustion chamber, and at the ignition timing designed to be after the top dead center on the compression stroke, the rich area can be formed around the tip of the ignition plug with the fuel injected at the compression-stroke-latter-half injection timing, and as a result, the combustion stability can be improved.

BRIEF DESCRIPTION OF THE DRAWINGS

FIGS. 3A and 3B are views illustrating a piston of the engine according to the embodiment of the present invention, in which FIG. 3A is a plan view of the piston and FIG. 3B is a view taken along a line A-A in FIG. 3A.

DETAILED DESCRIPTION OF EMBODIMENT

Hereinafter, a control system of an engine according to one embodiment of the present invention is described with reference to the accompanying drawings.

System Configuration

Figure 1:
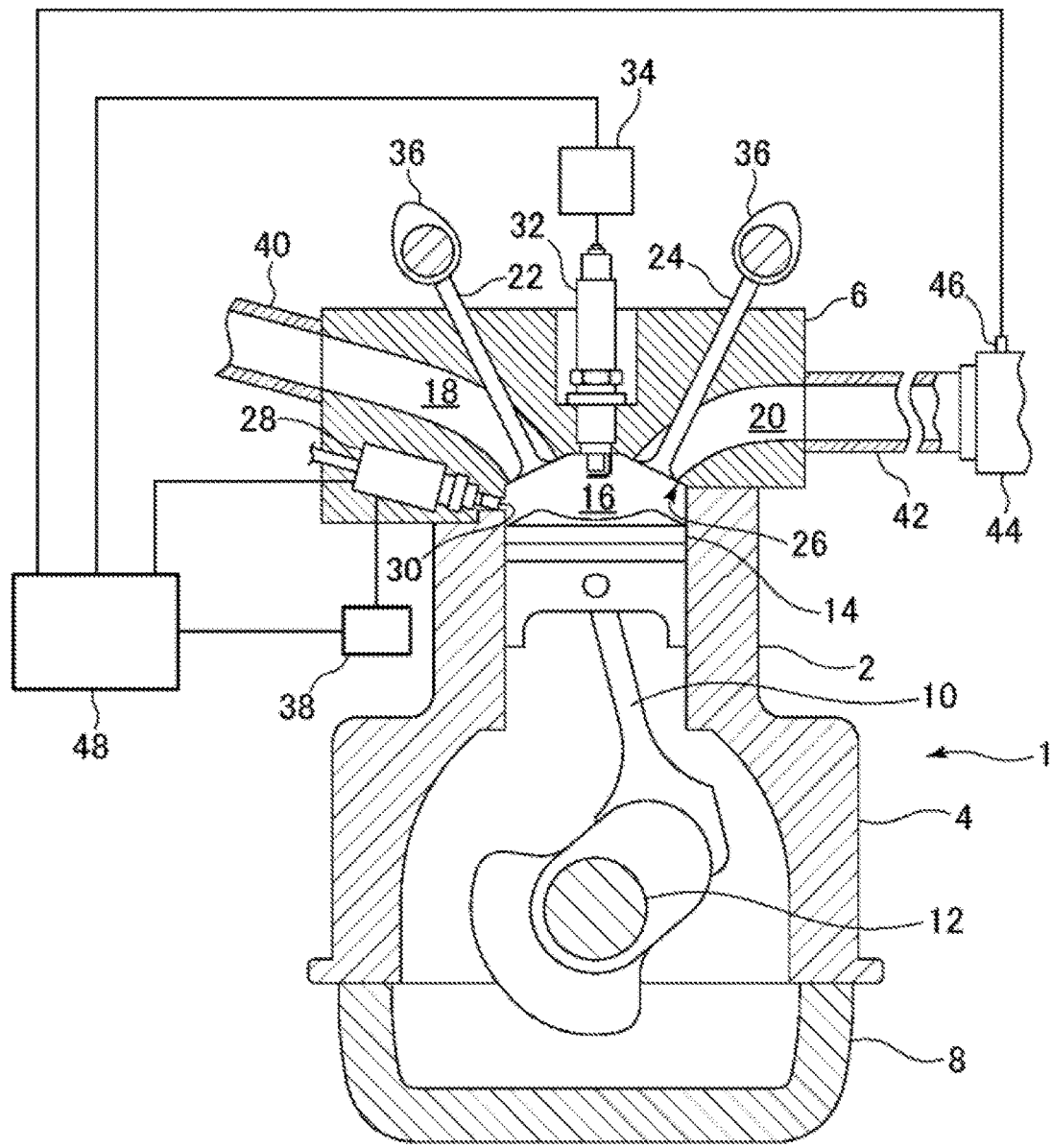
FIG. 1 is a view schematically illustrating a configuration of an engine to which a control system according to one embodiment of the present invention is applied.

First, a configuration of an engine to which a control system according to one embodiment of the present invention is applied is described with reference to FIG. 1. FIG. 1 is a view schematically illustrating the configuration of the engine to which the control system according to the embodiment of the present invention is applied.

In FIG. 1, the reference numeral "1" indicates the engine to which the control system according to this embodiment of the present invention is applied. The engine 1 is a gasoline engine that is mounted on a vehicle and supplied with fuel containing at least gasoline. The engine 1 includes a cylinder block 4 provided with a plurality of cylinders 2 (note that, although only one cylinder 2 is illustrated in FIG. 1, for example, four cylinders are linearly disposed), a cylinder head 6 disposed on the cylinder block 4, and an oil pan 8 disposed below the cylinder block 4 and storing a lubricant. A reciprocatable piston 14 coupled to a crankshaft 12 via a connecting rod 10 is fitted into each of the cylinders 2. The cylinder head 6, the cylinders 2, and the pistons 14 define combustion chambers 16.

In the cylinder head 6, two independent intake ports 18 and two independent exhaust ports 20 are formed for each of the cylinders 2, each of the intake ports 18 is provided with an intake valve 22 for opening and closing the intake port 18 on the combustion chamber 16 side and each of the exhaust ports 20 is provided with an exhaust valve 24 for opening and closing the exhaust port 20 on the combustion chamber 16 side. The intake port 18 functions as a tumble flow generator for generating a vortex flow in up-and-down directions of the piston (tumble flow) within the combustion chamber 16.

Further, a bottom surface of the cylinder head 6 forms ceilings 26 of the respective combustion chambers 16. Each of the ceilings 26 has a so-called pent-roof shape having two opposing inclined surfaces extending from a center portion of the ceiling 26 to a bottom end of the cylinder head 6.

Further, a (direct) injector 28 for directly injecting the fuel into the cylinder 2 is attached to the cylinder head 6 for each cylinder 2. Each injector 28 is arranged so that its plurality of nozzle holes 30 are oriented obliquely downward and toward an inside of the combustion chamber 16, at a position of a circumferential edge portion of the ceiling 26 of the combustion chamber 16, between the two intake ports 18. The injector 28 directly injects into the combustion chamber 16 an amount of fuel corresponding to an operating state of the engine 1, at an injection timing designed according to the operating state of the engine 1. A specific structure of the injector 28 is described later.

Moreover, an ignition plug 32 for forcibly igniting mixture gas inside the combustion chamber 16 is attached to the cylinder head 6 for each cylinder 2. Each ignition plug 32 is arranged penetrating the cylinder head 6 so as to extend downward from the center portion of the ceiling 26 of the combustion chamber 16. The ignition plug 32 is connected with an ignition circuit 34 for supplying a voltage to the ignition plug 32.

The cylinder head 6 is further provided with valve driving mechanisms 36 for driving the intake and exhaust valves 22 and 24 of each cylinder 2, respectively. The valve driving mechanisms 36 include, for example, a non-illustrated variable valve lift mechanism (VVL (Variable Valve Lift)) for changing lifts of the intake and exhaust valves 22 and 24, and a non-illustrated variable valve phase mechanism (VVT (Variable Valve Timing)) for changing a rotational phase of a camshaft with respect to the crankshaft 12.

A fuel supply path couples a fuel tank (not illustrated) to the injectors 28. A fuel supply system 38 for supplying the fuel to each of the injectors 28 at a desirable fuel pressure is provided within the fuel supply path. The pressure of the fuel applied to each injector 28 is changed according to the operating state of the engine 1.

On one side surface of the engine 1, as illustrated in FIG. 1, an intake passage 40 is connected to communicate with the intake ports 18 of the respective cylinders 2. On the other side surface of the engine 1, an exhaust passage 42 is connected to guide out burned gas (exhaust gas) discharged from the combustion chambers 16 of the respective cylinders 2.

A catalyst converter 44 for purifying the exhaust gas is connected with a downstream side of the exhaust passage 42. The catalyst converter 44 is provided with a catalyst temperature sensor 46 for detecting a catalyst temperature.

The engine 1 is controlled by a powertrain control module (hereinafter, referred to as the PCM) 48. The PCM 48 is comprised of a microprocessor including a CPU, a memory, a counter timer group, an interface, and paths for connecting these units. The PCM 48 forms a controller.

The PCM 48 receives detection signals of various kinds of sensors. Specifically, the PCM 48 receives a detection signal of the catalyst temperature sensor 46, and also detection signals of a fluid temperature sensor for detecting a temperature of an engine coolant, a crank angle sensor for detecting a rotational angle of the crankshaft 12, an accelerator position sensor for detecting an accelerator opening corresponding to an angle (operation amount) of an acceleration pedal of the vehicle, etc. Note that these sensors are not illustrated.

By performing various kinds of operations based on these detection signals, the PCM 48 determines the operating state of the engine 1 and further of the vehicle, and outputs control signals to the injectors 28, the ignition circuit 34, the valve driving mechanisms 36, the fuel supply system 38, etc., according to the determined state. In this manner, the PCM 48 operates the engine 1. Although described in detail later, the PCM 48 may be referred to as the control system of the engine 1, and functions as an ignition timing control module and a fuel injector control module.

Specific Structures of Pistons, Injectors, and Ignition Plugs

Figure 2:
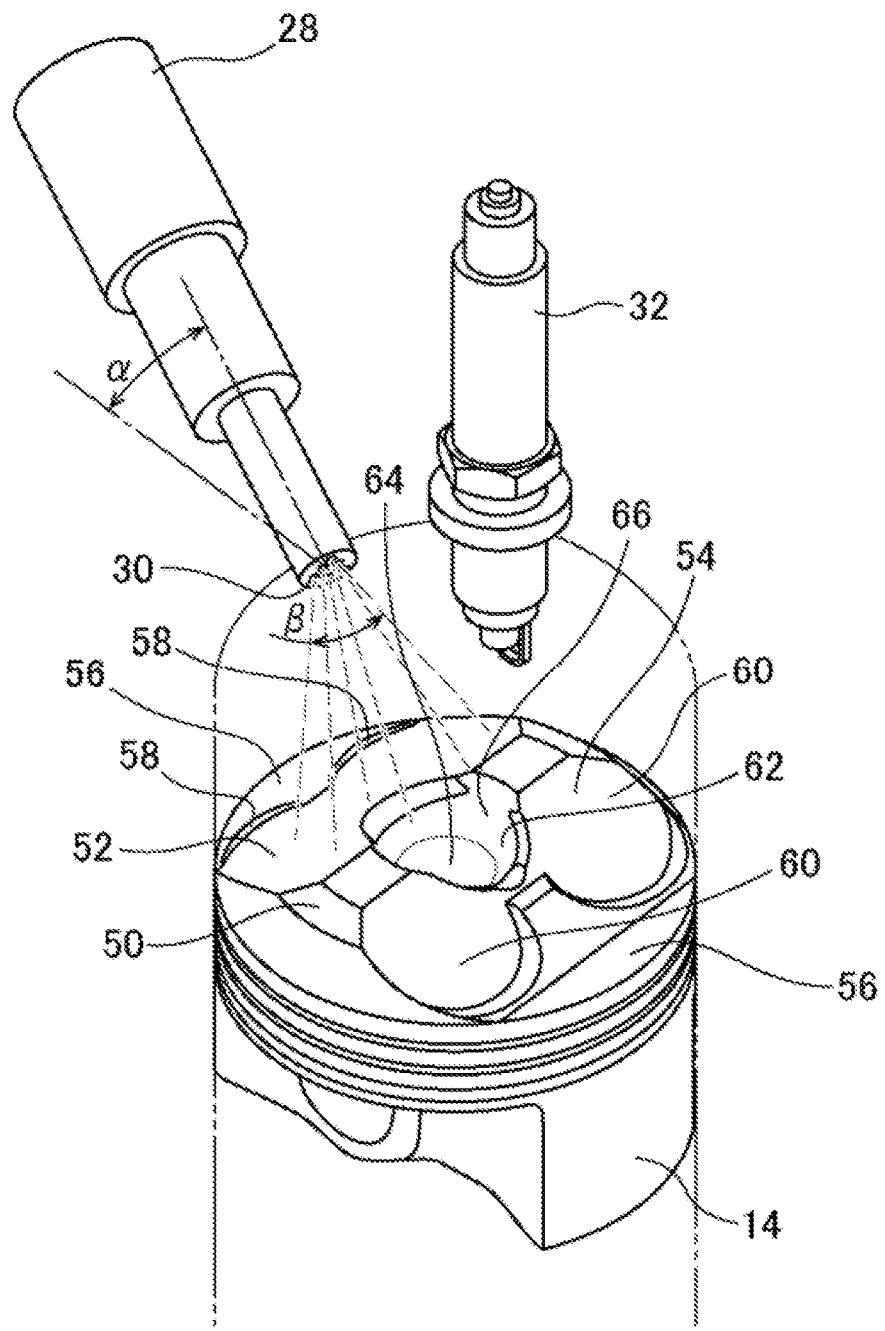
FIG. 2 is a perspective view illustrating specific structures of an injector and an ignition plug of the engine according to the embodiment of the present invention.
Figure 3A:
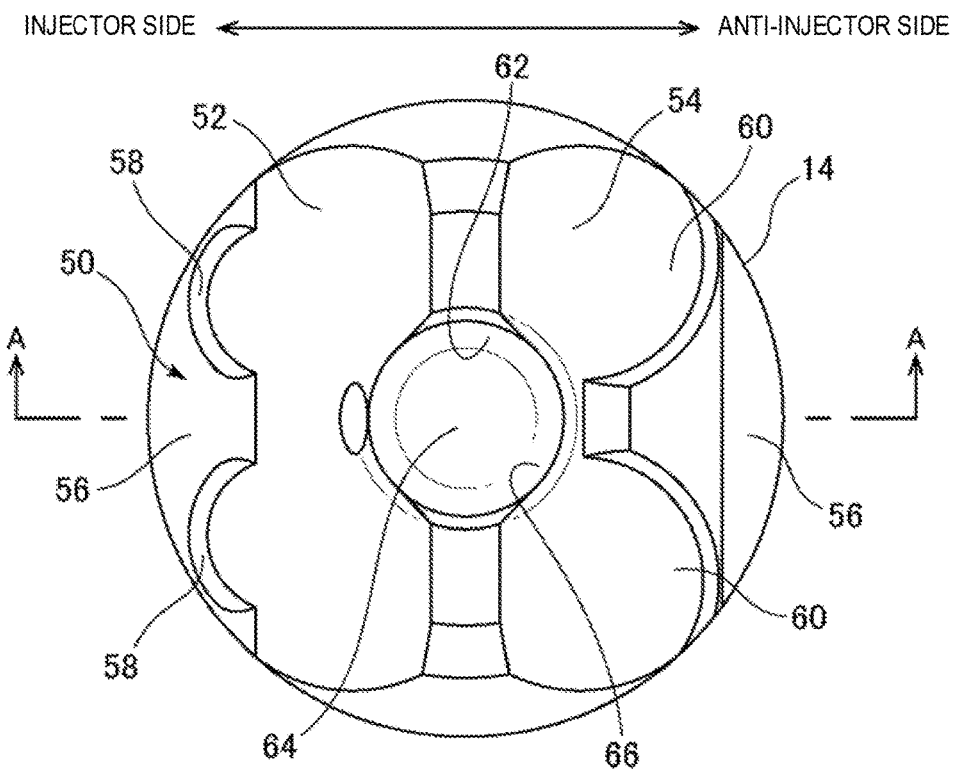
Figure 3B:
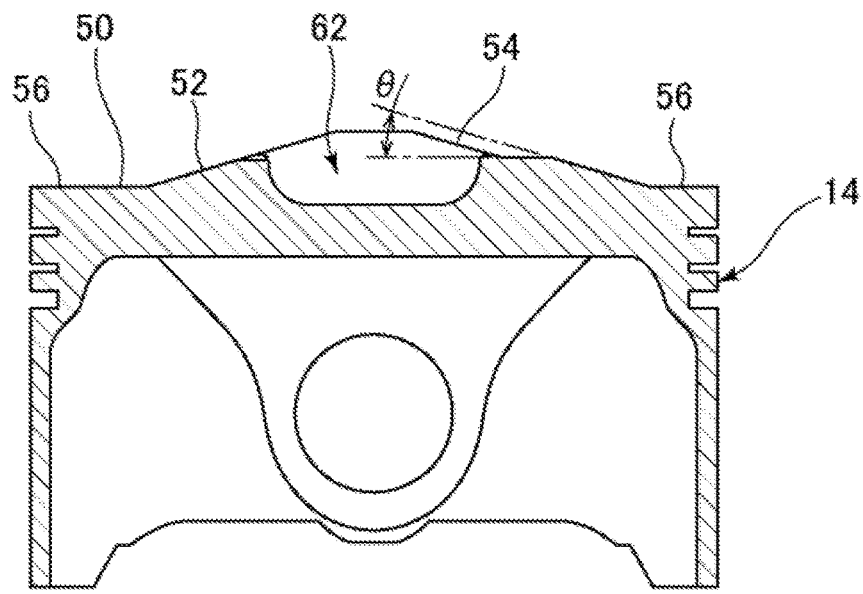

Next, specific structures of each piston 14, each injector 28, and each ignition plug 32 of the engine 1 of this embodiment are described with reference to FIGS. 2, 3A, and 3B. FIG. 2 is a perspective view illustrating the specific structures of the injector 28 and the ignition plug 32 of the engine 1 according to the embodiment of the present invention. FIGS. 3A and 3B are views illustrating the piston 14 of the engine 1 according to the embodiment of the present invention, in which FIG. 3A is a plan view of the piston 14 and FIG. 3B is a view taken along a line A-A in FIG. 3A.

As illustrated in FIG. 2, the injector 28 is a multi-hole injector having the plurality of nozzle holes 30. The injector 28 is provided so that its axial direction inclines downward by an inclined angle α from a horizontal direction. Thus, fuel spray injected from the nozzle holes 30 of the injector 28 radially spreads at a predetermined spread angle (β, obliquely downward from the circumferential edge portion of the ceiling 26 of the combustion chamber 16.

As illustrated in FIGS. 2, 3A, and 3B, a crown surface 50 forming a top portion of the piston 14 is formed to bulge toward its center. Specifically, the crown surface 50 has an injector-side inclined surface 52 extending obliquely upward from an end portion of the crown surface 50 on the injector 28 side toward the center of the crown surface 50, and an anti-injector-side inclined surface 54 extending obliquely upward from an end portion of the crown surface 50 on an opposite side from the injector 28 (hereinafter, may be referred to as the "anti-injector-side") toward the center of the crown surface 50 at an inclination angle θ. The injector-side inclined surface 52 and the anti-injector-side inclined surface 54 are formed along the shape of the ceiling 26 of the combustion chamber 16.

Further, each of the end portion of the crown surface 50 on the injector 28 side and the end portion on the anti-injector side is formed with a horizontal surface 56 as a reference surface of the crown surface 50.

Intake valve recesses 58 are formed in the horizontal surface 56 on the injector 28 side to avoid contact between the piston 14 and the intake valves 22, and exhaust valve recesses 60 are formed in the anti-injector-side inclined surface 54 to avoid contact between the piston 14 and the exhaust valves 24.

A cavity 62 dented substantially circularly in a plan view is formed at the center of the crown surface 50. The cavity 62 is formed by a horizontal bottom surface 64 having a substantially circular shape in a plan view, and a side surface 66 inclining radially upward from an outer circumference of the bottom surface 64. When the piston 14 is at a top dead center, a tip of the ignition plug 32 is located within the cavity 62, and thus, a substantially ball-shaped combustion space centering on the tip of the ignition plug 32 is formed.

Fuel Injection Timing

Next, a control of the fuel injection timing by the control system of the engine 1 of this embodiment is described with reference to FIG. 4.

Figure 4:
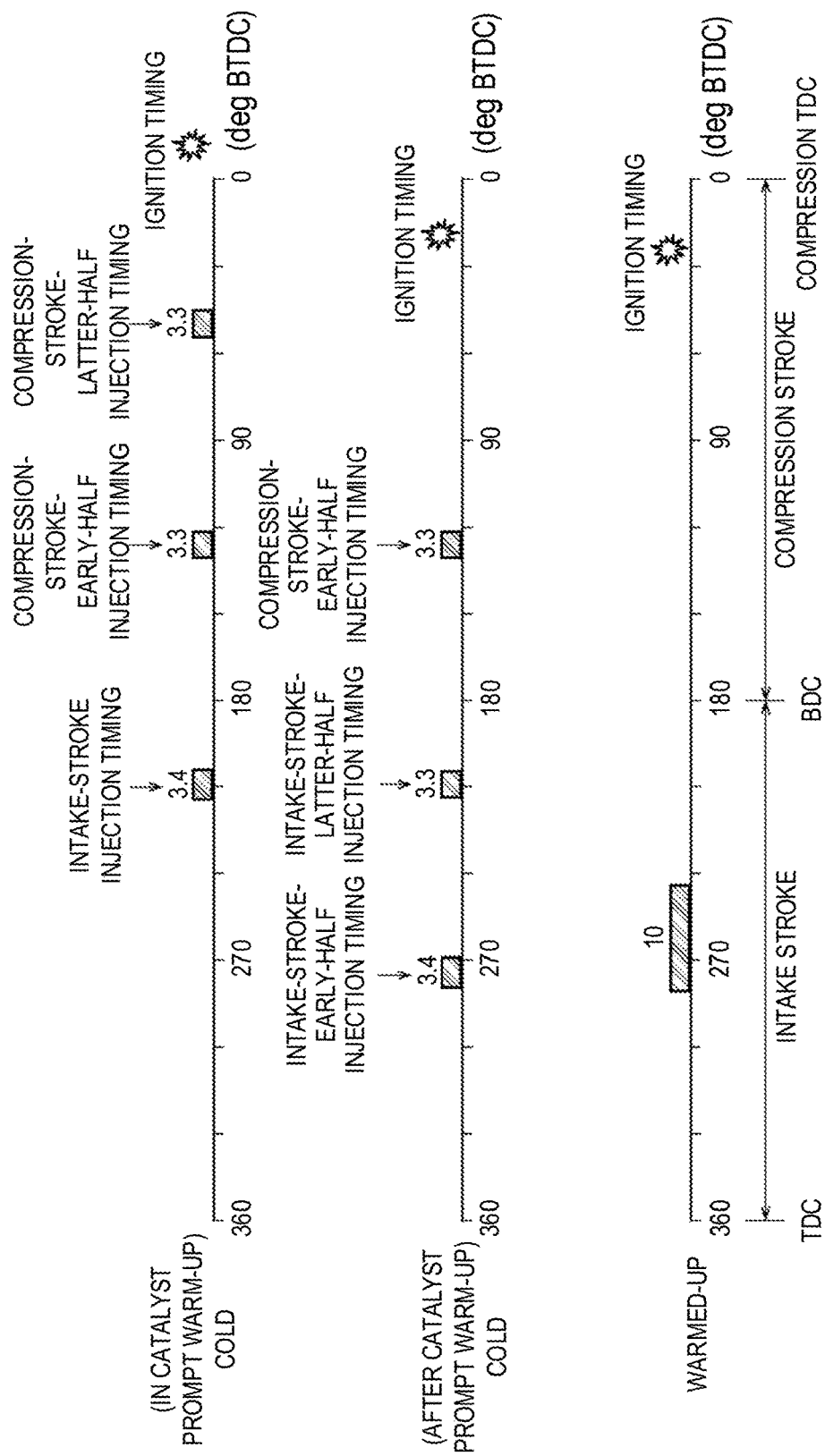
FIG. 4 illustrates time charts of fuel injection timings controlled by the control system of the engine according to the embodiment of the present invention.

FIG. 4 illustrates time charts of fuel injection timings controlled by the control system of the engine 1 according to the embodiment of the present invention, in which the horizontal axis indicates a crank angle before a CTDC (deg BTDC), and the numbers above the bars that indicate the fuel injection timings are fuel injection amounts at the respective fuel injection timings when the total fuel injection amount in one cycle (operation cycle of the cylinder) is 10.

As illustrated in FIG. 4, when the operating state of the engine 1 corresponds to immediately after a cold start, the catalyst is not active, and the engine needs to be warmed up promptly, i.e., the catalyst temperature needs to be increased to an activating temperature or above (catalyst prompt warm-up state, corresponding to part of a cold state), the PCM 48 sets the ignition timing to be after the CTDC and, to prevent degradation of an emission performance and improve combustion stability, performs the fuel injection in each cycle by splitting it into three injections.

Specifically, the fuel is injected from the injector 28 by being split into three injection timings: an intake-stroke injection timing designed to be on intake stroke of the cylinder 2, more specifically, around 215 [deg BTDC]; a compression-stroke-early-half injection timing designed to be in an early half of compression stroke of the cylinder 2, more specifically, between 160 and 110 [deg BTDC]; and a compression-stroke-latter-half injection timing designed to be in a latter half of the compression stroke of the cylinder 2, more specifically, around 55 [deg BTDC]. Particularly, the compression-stroke-early-half injection timing is designed to be a timing at which a range of a center axis of the combustion chamber 16 intersecting with an extension of an injection range of the fuel injected by the injector 28 at the predetermined spread angle β is located above a position of the center axis intersecting with an extension plane of the anti-injector-side inclined surface 54 of the crown surface 50.

When a total fuel injection amount in one cycle is 10, a ratio of the fuel injection amounts at these respective injection timings is 3.4:3.3:3.3 (intake-stroke injection timing: compression-stroke-early-half injection timing: compression-stroke-latter-half injection timing). Note that the total fuel injection amount in one cycle is designed so that the mixture gas becomes lean as a whole, which is thinner than a theoretical air-fuel ratio.

Further, when the operating state of the engine 1 is the cold state after the catalyst prompt warm-up state, the PCM 48 sets the ignition timing to be before the CTDC and, to improve the combustion stability, performs the fuel injection in each cycle by splitting it into three injections.

Specifically, the fuel is injected from the injector 28 by being split into three injection timings: an intake-stroke-early-half injection timing designed to be in an early half of the intake stroke of the cylinder 2, more specifically, around 280 [deg BTDC]; an intake-stroke-latter-half injection timing designed to be in a latter half of the intake stroke of the cylinder 2, more specifically, around 215 [deg BTDC]; and a compression-stroke-early-half injection timing designed to be in the early half of the compression stroke of the cylinder 2, specifically, between 160 and 110 [deg BTDC]. When the total fuel injection amount in one cycle is 10, a ratio of the fuel injection amounts at these respective injection timings is 3.4:3.3:3.3 (intake-stroke-early-half injection timing: intake-stroke-latter-half injection timing: compression-stroke-early-half injection timing). Note that the total fuel injection amount in one cycle is designed so that the mixture gas becomes lean as a whole, which is thinner than a theoretical air-fuel ratio.

Further, when the operating state of the engine 1 is a warmed-up state, the PCM 48 injects the fuel entirely by the injector 28 at an intake-stroke injection timing designed to be on the intake stroke of the cylinder 2, more specifically, around 280 [deg BTDC].

Specifically, when the operating state of the engine 1 is the warmed-up state in which the combustion stability is high, the fuel is entirely injected at the intake-stroke injection timing to stimulate vaporization of the fuel and uniformly distribute the fuel inside the combustion chamber 16, so as to improve the emission performance.

State Inside Combustion Chamber

Next, states inside the combustion chamber when the control system of the engine 1 of this embodiment controls the fuel injection timing are described with reference to FIGS. 5 to 13.

Figure 5:
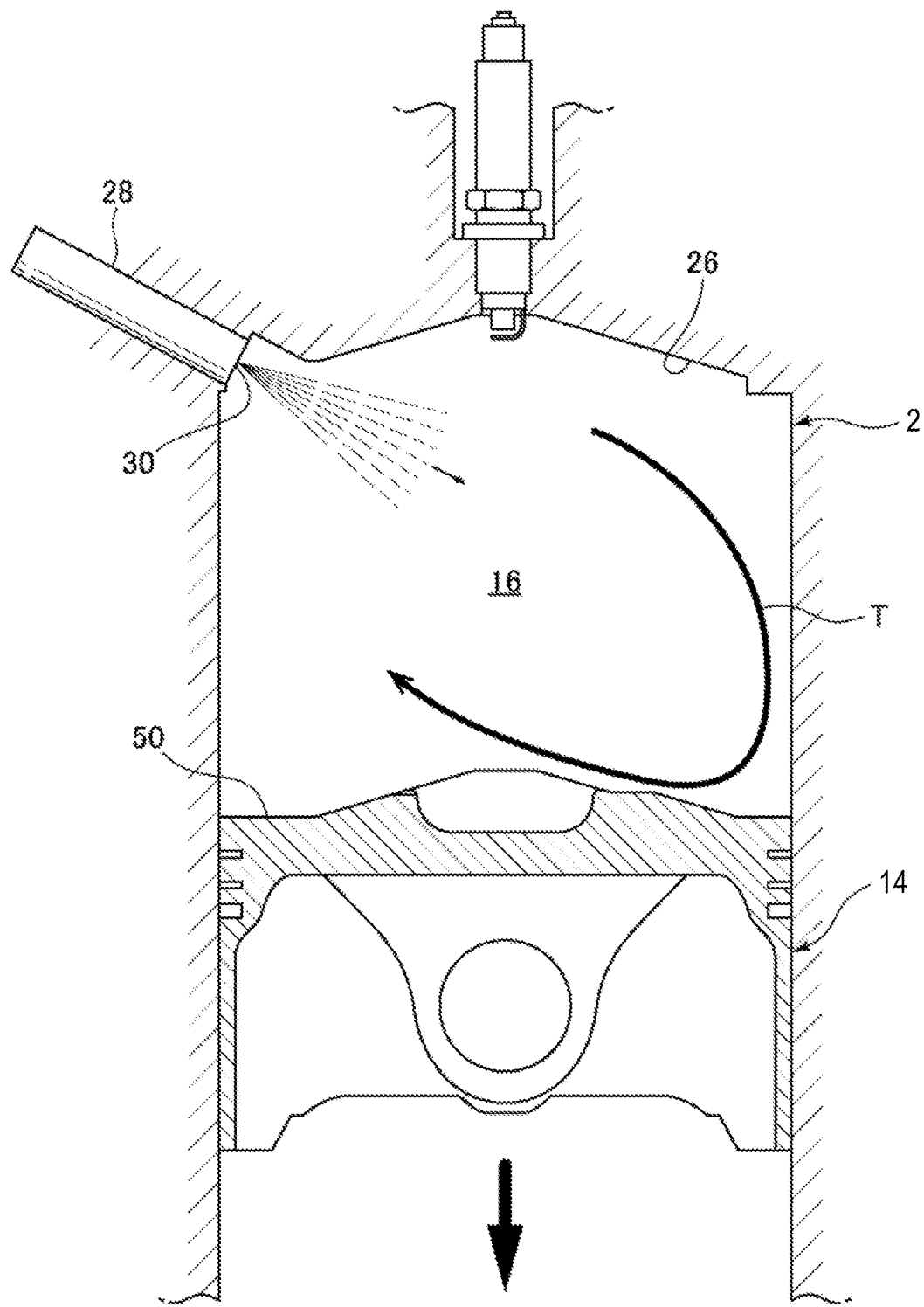
FIG. 5 is a cross-sectional view illustrating a state inside a combustion chamber when fuel is injected on intake stroke in a catalyst prompt warm-up state by the control system according to the embodiment of the present invention.
Figure 6:
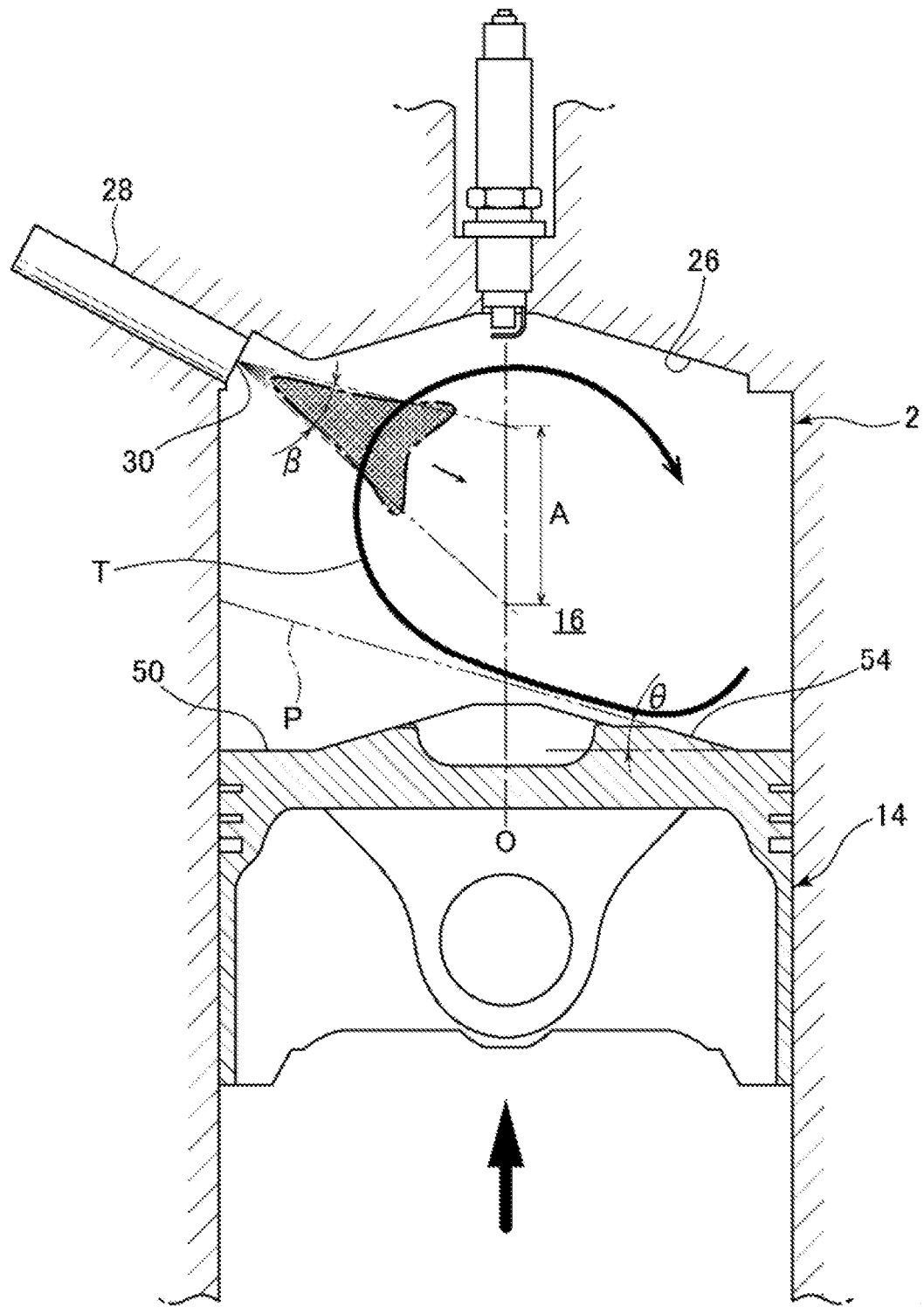
FIG. 6 is a cross-sectional view illustrating a state inside the combustion chamber when the fuel is injected in an early half of compression stroke in the catalyst prompt warm-up state by the control system according to the embodiment of the present invention.
Figure 7:
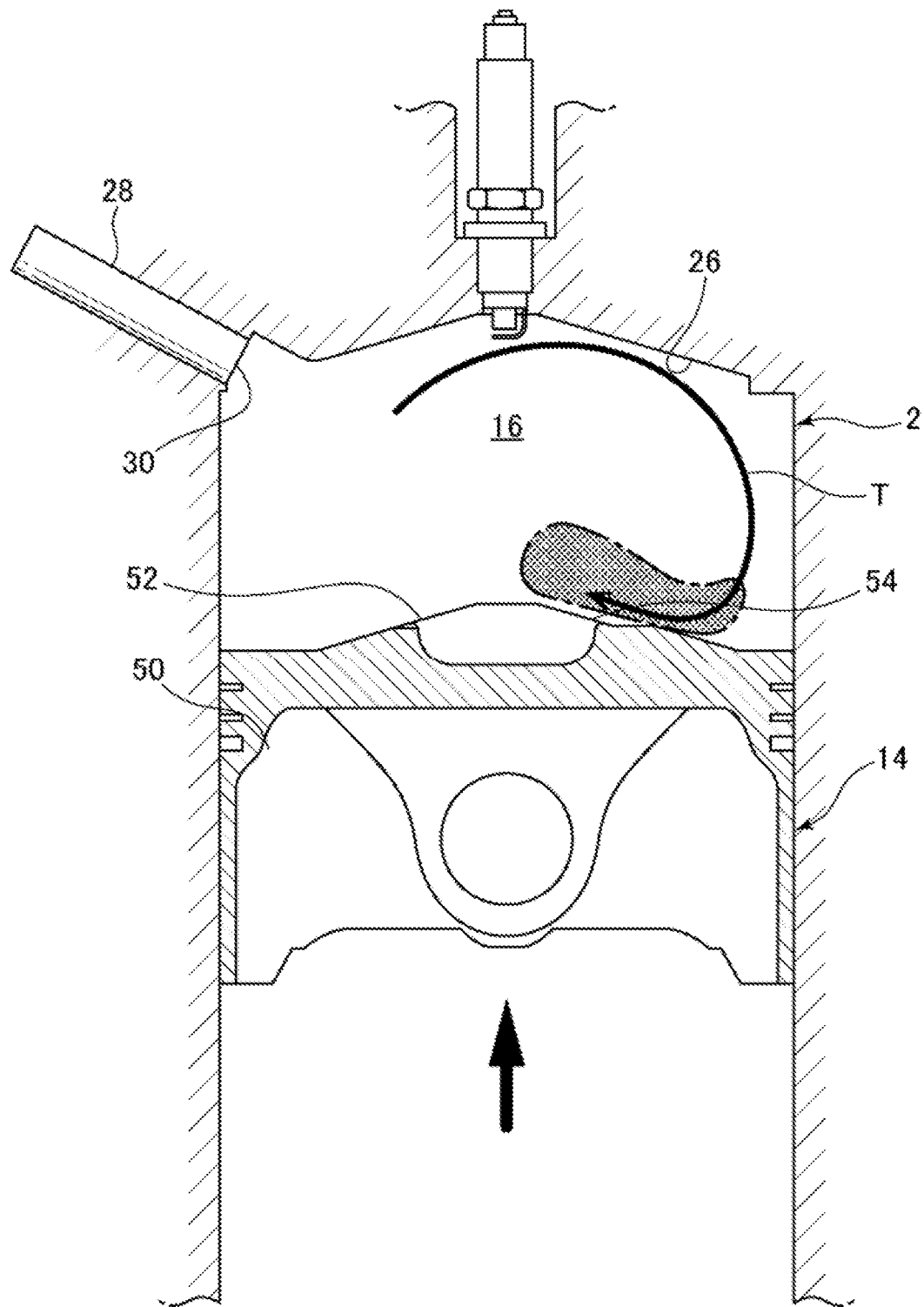
FIG. 7 is a cross-sectional view illustrating a state inside the combustion chamber after the fuel is injected in the early half of the compression stroke in the catalyst prompt warm-up state by the control system according to the embodiment of the present invention.
Figure 8:
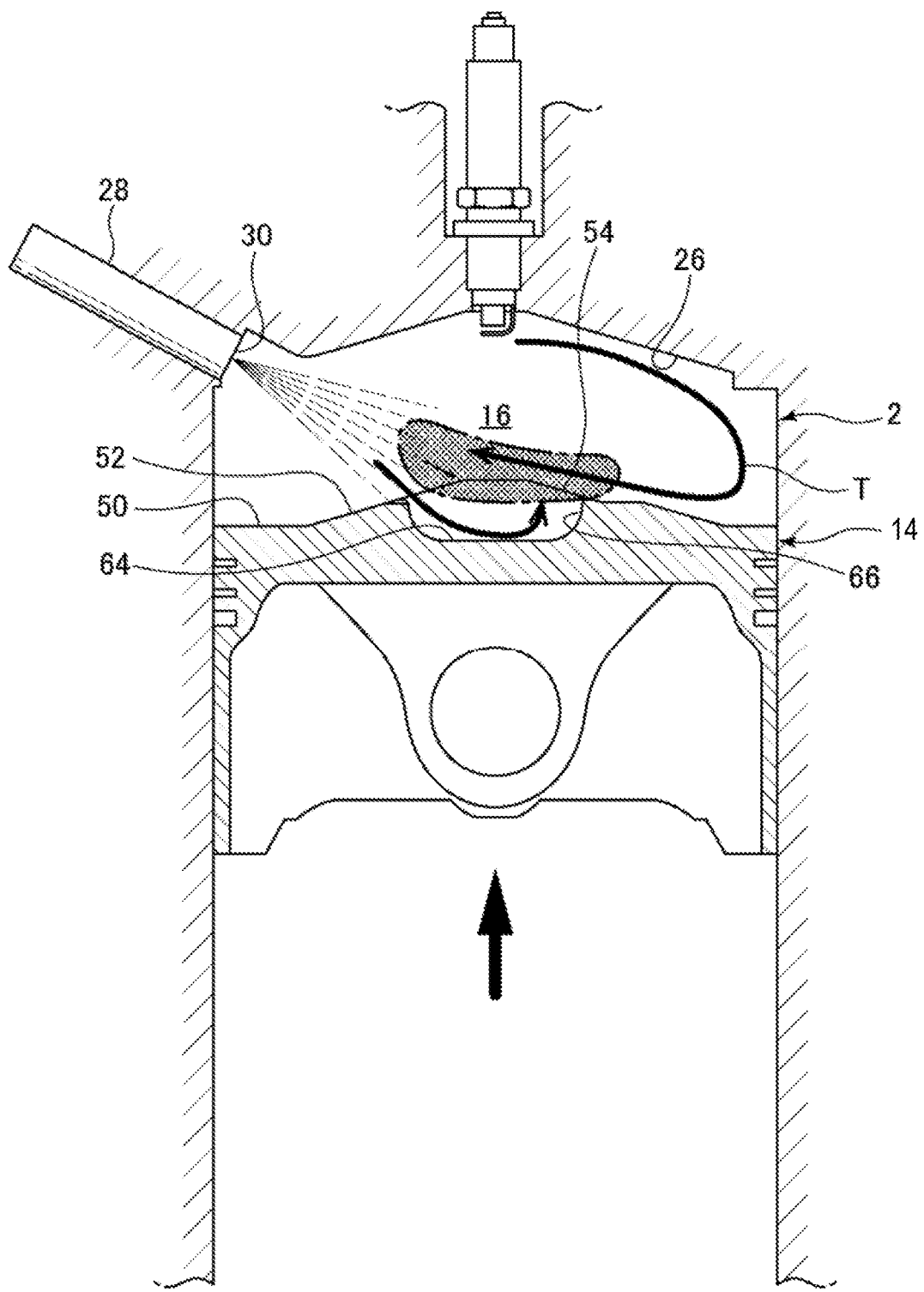
FIG. 8 is a cross-sectional view illustrating a state inside the combustion chamber when the fuel is injected in a latter half of the compression stroke in the catalyst prompt warm-up state by the control system according to the embodiment of the present invention.
Figure 9:
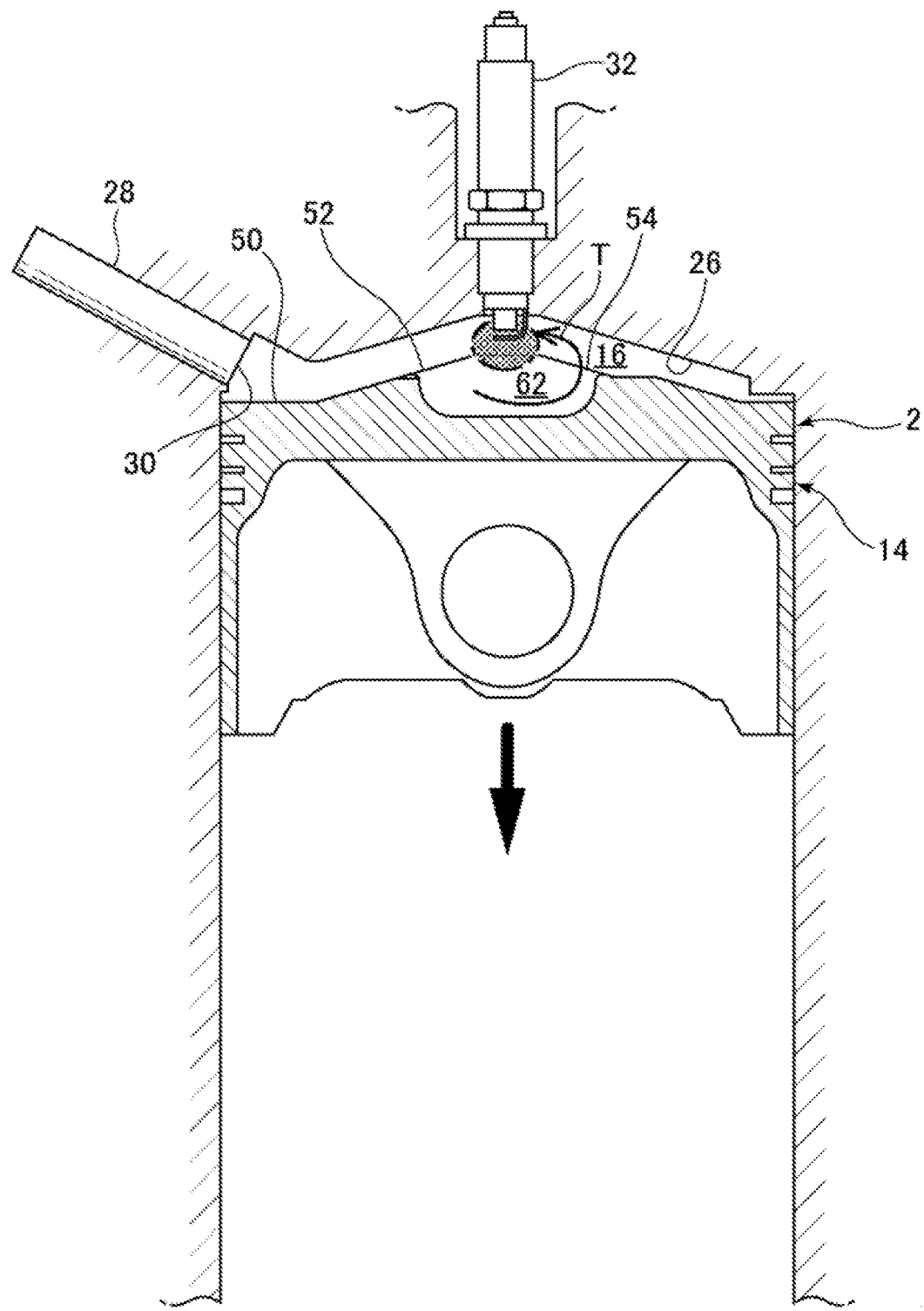
FIG. 9 is a cross-sectional view illustrating a state inside the combustion chamber at an ignition timing in the catalyst prompt warm-up state with the control system according to the embodiment of the present invention.

FIGS. 5 to 9 are cross-sectional views illustrating states inside the combustion chamber in the catalyst prompt warm-up state of the engine 1 of this embodiment, in which FIG. 5 is a state when the fuel is injected on the intake stroke, FIG. 6 is a state when the fuel is injected in the early half of the compression stroke, FIG. 7 is a state after the fuel is injected in the early half of the compression stroke, FIG. 8 is a state when the fuel is injected in the latter half of the compression stroke, and FIG. 9 is a state at the ignition timing.

Figure 10:
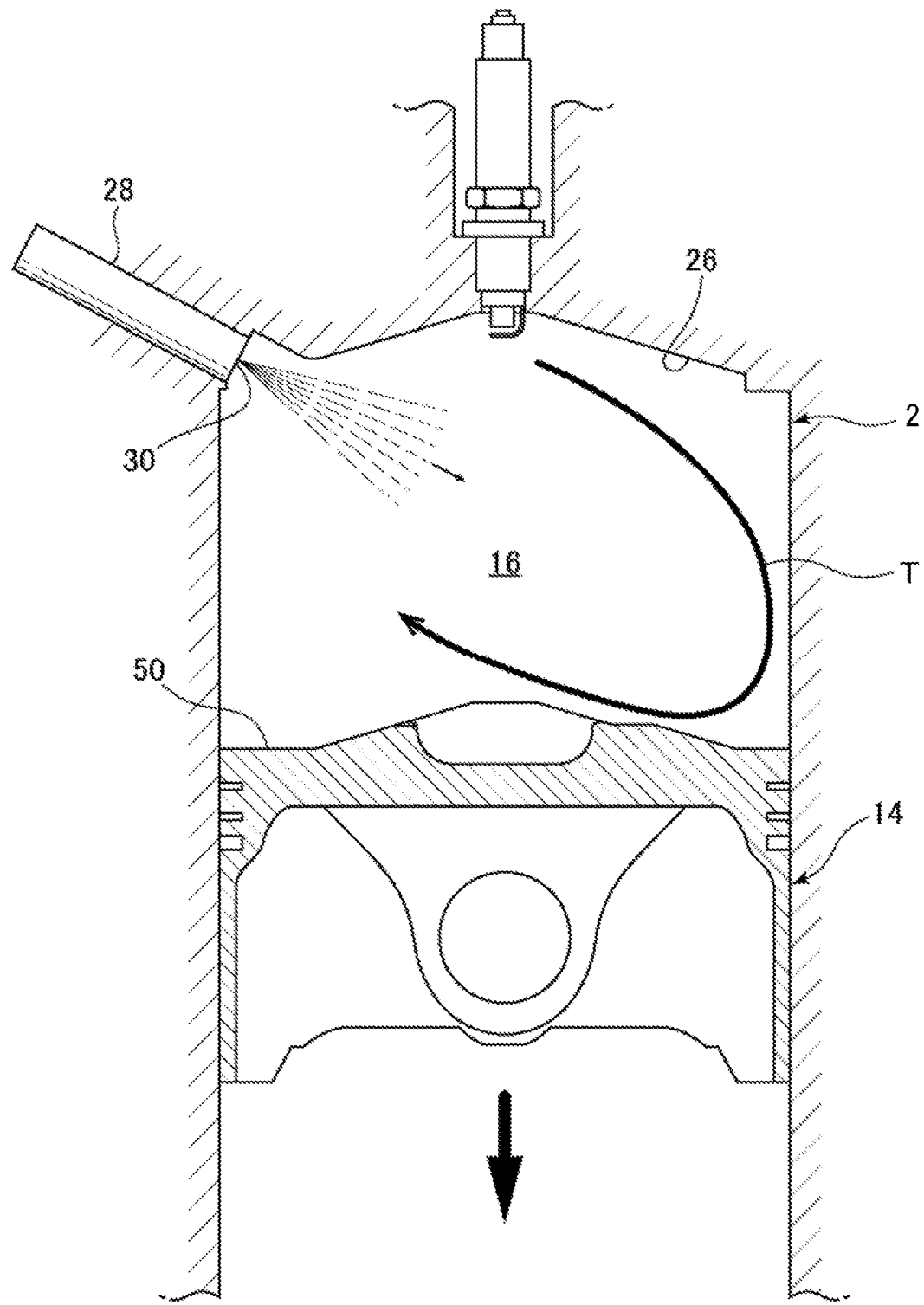
FIG. 10 is a cross-sectional view illustrating a state inside the combustion chamber when the fuel is injected in an early half of the intake stroke in a cold state by the control system according to the embodiment of the present invention.
Figure 11:
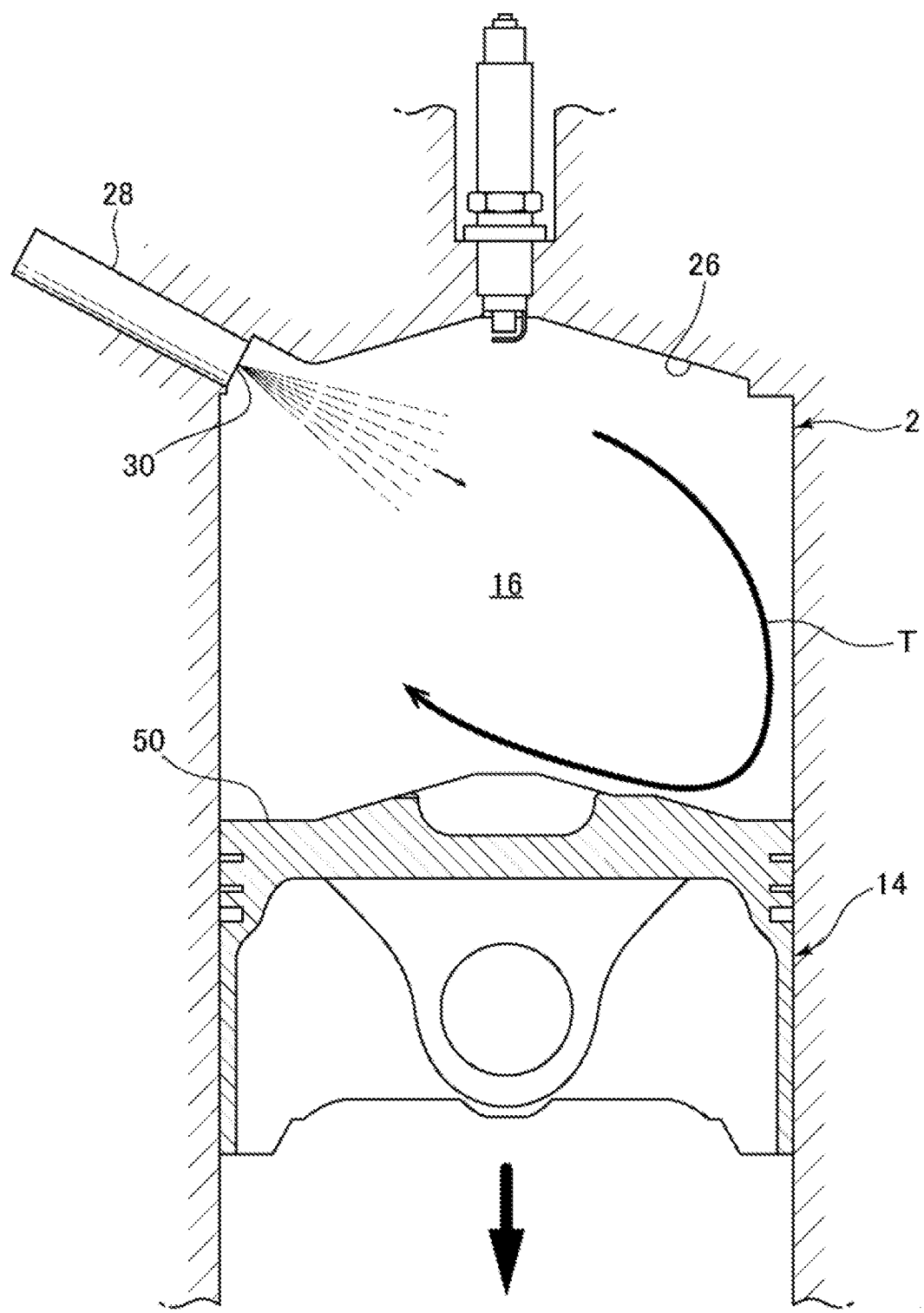
FIG. 11 is a cross-sectional view illustrating a state inside the combustion chamber when the fuel is injected in a latter half of the intake stroke in the cold state by the control system according to the embodiment of the present invention.
Figure 12:
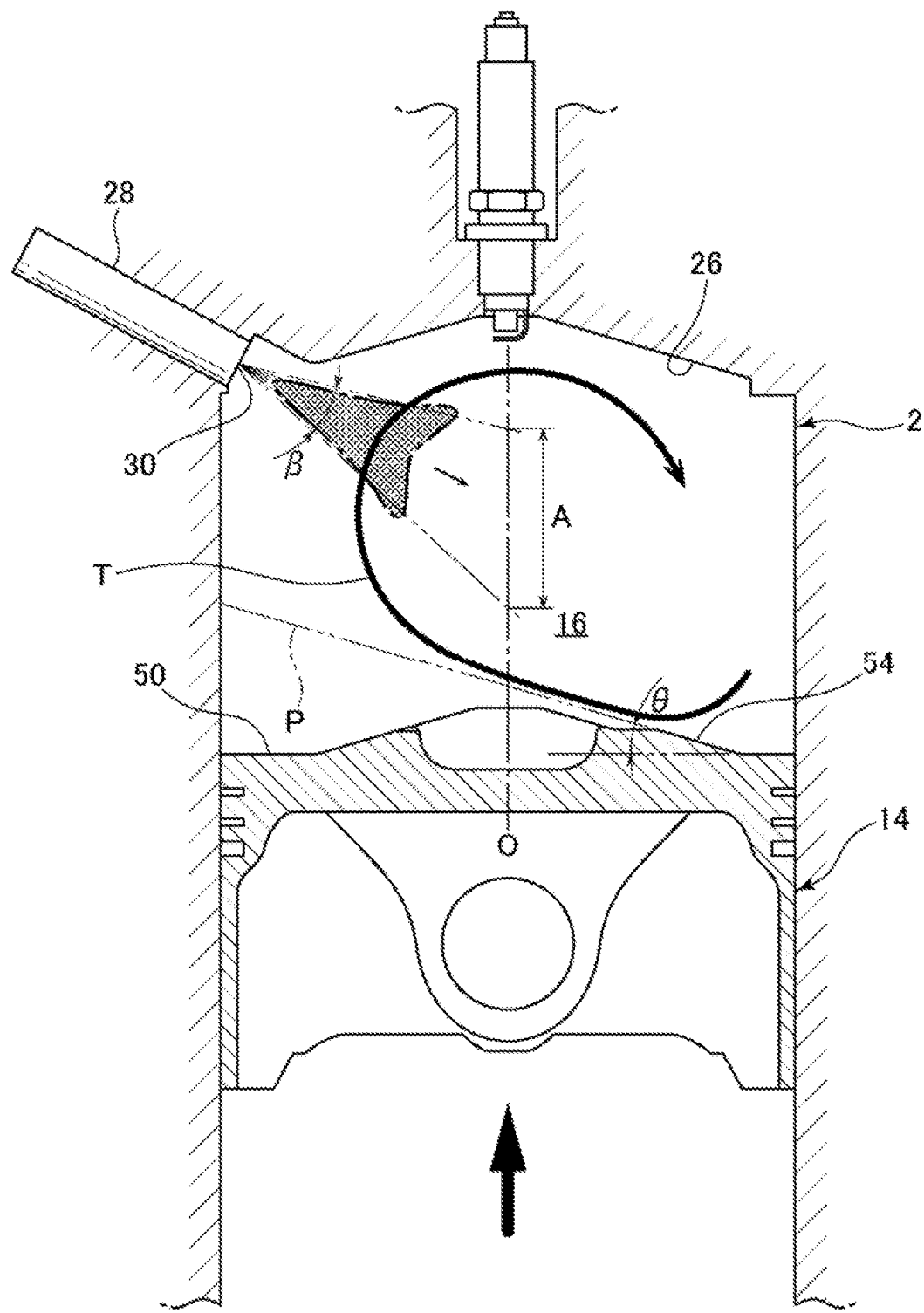
FIG. 12 is a cross-sectional view illustrating a state inside the combustion chamber after the fuel is injected in the early half of the compression stroke in the cold state by the control system according to the embodiment of the present invention.
Figure 13:
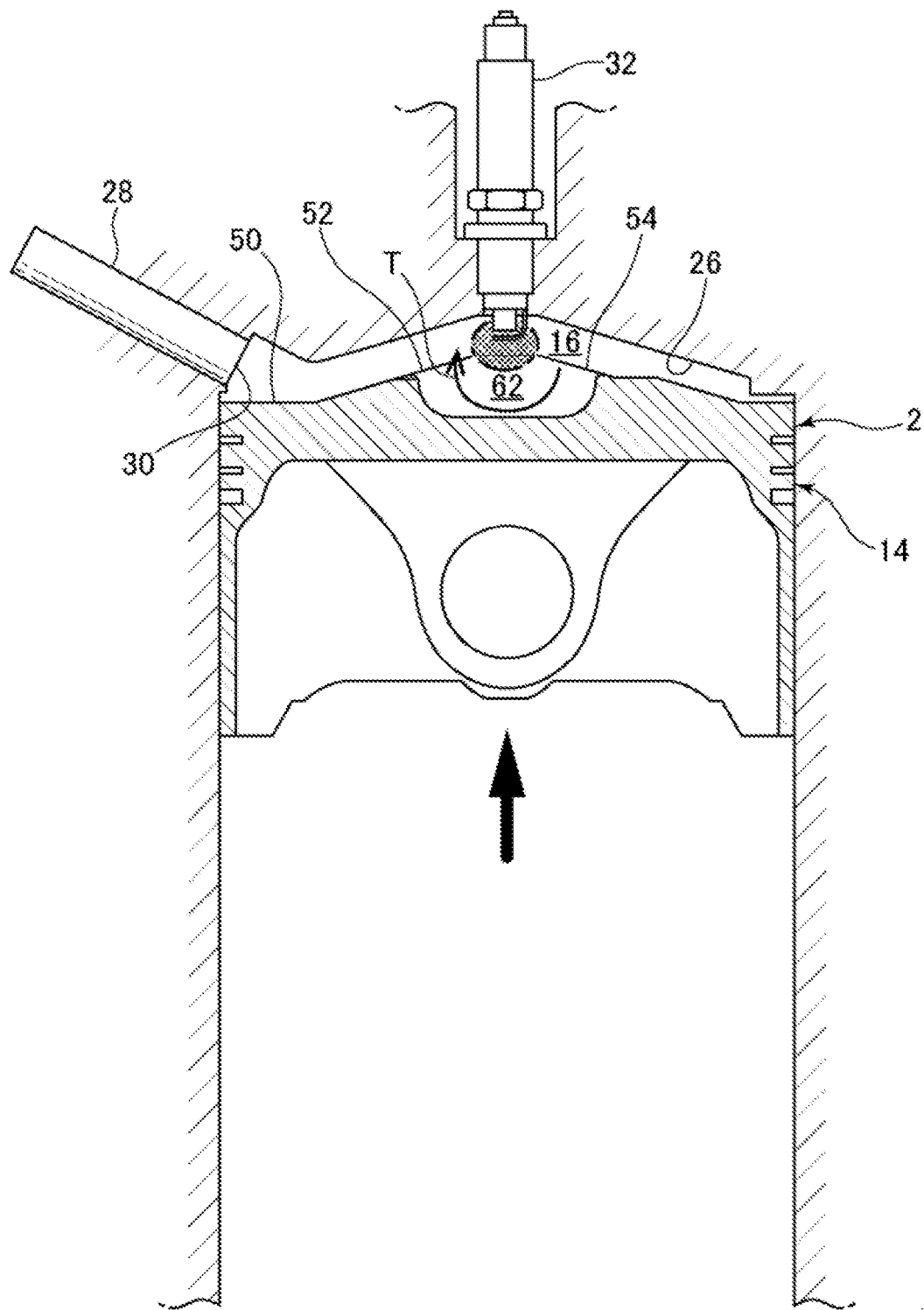
FIG. 13 is a cross-sectional view illustrating a state inside the combustion chamber at the ignition timing in the cold state with the control system according to the embodiment of the present invention.

Moreover, FIGS. 10 to 13 are cross-sectional views illustrating states inside the combustion chamber in the cold state of the engine 1 of this embodiment, in which FIG. 10 is a state when the fuel is injected in the early half of the intake stroke, FIG. 11 is a state when the fuel is injected in the latter half of the intake stroke, FIG. 12 is a state after the fuel is injected in the early half of the compression stroke, and FIG. 13 is a state at the ignition timing.

State Inside Combustion Chamber in Catalyst Prompt Warm-Up State

First, at the intake-stroke injection timing in the catalyst prompt warm-up state, as illustrated in FIG. 5, a tumble flow T (the vortex flow in the up-and-down directions of the piston) is generated by intake air flowed into the combustion chamber 16 from the intake ports 18 due to the intake valves 22 being opened and the piston 14 descending. When the PCM 48 controls the injector 28 and the fuel supply system 38 to inject the fuel from the injector 28 at the intake-stroke injection timing, the injected fuel flows within the combustion chamber 16 along the tumble flow T. Especially around 215 [deg BTDC] corresponding to the intake-stroke injection timing, the gas within the combustion chamber 16 flows actively. Therefore, vaporization of the fuel injected into the combustion chamber 16 can be stimulated. Further, since a time length from the intake-stroke injection timing to the ignition timing is long, sufficient time can be secured to vaporize the fuel injected at the intake-stroke injection timing and the fuel can uniformly be distributed inside the combustion chamber 16.

Next, at the compression-stroke-early-half injection timing in the catalyst prompt warm-up state, as illustrated in FIG. 6, the tumble flow T generated on the intake stroke shifts in the vortex shape between the ceiling 26 of the combustion chamber 16 and the crown surface 50 while being compressed in the up-and-down directions as the piston 14 elevates. Particularly, a lower section of the tumble flow T is oriented obliquely upward and toward the injector 28 along the anti-injector-side inclined surface 54 of the crown surface 50.

Between 160 and 110 [deg BTDC] corresponding to the compression-stroke-early-half injection timing, the range A of the center axis O of the combustion chamber 16 intersecting with the extension of the injection range of the fuel injected by the injector 28 at the predetermined spread angle β is located above the position of the center axis O intersecting with the extension plane P of the anti-injector-side inclined surface 54 of the crown surface 50.

Therefore, when the PCM 48 controls the injector 28 and the fuel supply system 38 to inject the fuel from the injector 28 at the compression-stroke-early-half injection timing, the injected fuel is oriented toward a vortex center of the tumble flow T, at a position above the lower section of the tumble flow T oriented obliquely upward and toward the injector 28 along the anti-injector-side inclined surface 54 of the crown surface 50.

In this case, the penetration of the fuel in its injection direction is suppressed by a kinetic energy of the tumble flow T oriented in a direction perpendicular to the injection direction of the fuel. Thus, the fuel does not penetrate the tumble flow T and the fuel adhesion to a wall surface of the combustion chamber 16 is suppressed.

Further, since the compression-stroke-early-half injection timing is designed, as described above, to be the timing at which the range A of the center axis O of the combustion chamber 16 intersecting with the extension of the injection range of the fuel injected by the injector 28 at the predetermined spread angle β is located above the position of the center axis O intersecting with the extension plane P of the anti-injector-side inclined surface 54 of the crown surface 50, the compression-stroke-early-half injection timing is designed to be earlier as the inclination angle θ of the anti-injector-side inclined surface 54 of the crown surface 50 becomes larger. Therefore, the timing at which the PCM 48 controls the injector 28 to inject the fuel is designed earlier as the inclination angle θ of the anti-injector-side inclined surface 54 becomes larger, that is, an upward angle at which the lower section of the tumble flow T is oriented along the anti-injector-side inclined surface 54 becomes larger and the vortex center of the tumble flow T shifts upward of the combustion chamber 16. In other words, regardless of the inclination angle θ of the anti-injector-side inclined surface 54, the fuel injected by the injector 28 at the compression-stroke-early-half injection timing is oriented toward the vortex center of the tumble flow T.

The stippled area surrounded by the thick one-dotted chain line in FIGS. 6 and 7 indicates a rich area with the fuel formed within part of the tumble flow T by the fuel injection at the compression-stroke-early-half injection timing. As illustrated in FIGS. 6 and 7, the rich area shifts in position in the vortex shape within the combustion chamber 16 along the tumble flow T. For example, around 90 [deg BTDC] after the fuel injection at the compression-stroke-early-half injection timing, as illustrated in FIG. 7, the rich area shifts near the anti-injector-side inclined surface 54 of the crown surface 50.

Next, at the compression-stroke-latter-half injection timing in the catalyst prompt warm-up state, as illustrated in FIG. 8, the tumble flow T is compressed even more in the up-and-down directions as the piston 14 elevates. Here, the rich area with the fuel formed within the part of the tumble flow T by the fuel injection at the compression-stroke-early-half injection timing shifts obliquely upward and toward the injector 28 side along the anti-injector-side inclined surface 54 of the crown surface 50, and is located above the cavity 62.

Around 55 [deg BTDC] corresponding to the compression-stroke-latter-half injection timing, the injection direction of the fuel by the injector 28 is oriented toward the cavity 62. Therefore, when the PCM 48 controls the injector 28 and the fuel supply system 38 to inject the fuel from the injector 28 at the compression-stroke-latter-half injection timing, as illustrated in FIG. 8, the injected fuel flows upward of the cavity 62 along the bottom and side surfaces 64 and 66 thereof, and pushes the rich area located above the cavity 62 to flow toward the ignition plug 32.

The fuel injected at the compression-stroke-latter-half injection timing and the rich area pushed further upward of the cavity 62 by the fuel injection, shift in position toward the ignition plug 32. Then upon arrival of the ignition timing designed to be after the CTDC, as illustrated in FIG. 9, the rich area is formed around the tip of the ignition plug 32. Thus, the combustion stability can be improved and can further be secured even after the CTDC.

As described above, in the catalyst prompt warm-up state, the PCM 48 splits the fuel injection timing into the three timings of the intake-stroke injection timing, the compression-stroke-early-half injection timing, and the compression-stroke-latter-half injection timing, and controls the injector 28 to inject the fuel so that the ratio of the fuel injection amounts at the respective injection timings becomes 3.4:3.3:3.3 (intake-stroke injection timing: compression-stroke-early-half injection timing: compression-stroke-latter-half injection timing).

Specifically, the fuel is uniformly distributed inside the combustion chamber 16 by the fuel injection at the intake-stroke injection timing so as to improve the emission performance, and the rich area is formed around the ignition plug 32 at the ignition timing after the CTDC by the fuel injections at the compression-stroke-early-half injection timing and the compression-stroke-latter-half injection timing so as to improve the combustion stability. Particularly, by splitting the fuel injection timing on the compression stroke into the compression-stroke-early-half injection timing and the compression-stroke-latter-half injection timing, the fuel injection amount at the compression-stroke-latter-half injection timing is reduced to suppress the fuel adhesion to the crown surface 50.

State Inside Combustion Chamber in Cold State

Next, at the intake-stroke-early-half injection timing in the cold state after the catalyst prompt warm-up state, as illustrated in FIG. 10, a tumble flow T (the vortex flow in the up-and-down directions of the piston) is generated by intake air flowed into the combustion chamber 16 from the intake ports 18 due to the intake valves 22 being opened and the piston 14 descending. When the PCM 48 controls the injector 28 and the fuel supply system 38 to inject the fuel from the injector 28 at the intake-stroke-early-half injection timing, the injected fuel flows within the combustion chamber 16 along the tumble flow T. Specifically, around 280 [deg BTDC] corresponding to the intake-stroke-early-half injection timing, a descending speed of the piston 14 reaches its highest peak and the gas within the combustion chamber 16 flows most actively. Therefore, vaporization of the fuel injected into the combustion chamber 16 can be stimulated more. Further, since a time length from the intake-stroke-early-half injection timing to the ignition timing is long, sufficient time can be secured to vaporize the fuel injected at the intake-stroke-early-half injection timing and the fuel can uniformly be distributed inside the combustion chamber 16.

Next, at the intake-stroke-latter-half injection timing in the cold state after the catalyst prompt warm-up state, as illustrated in FIG. 11, the tumble flow T generated in the early half of the intake stroke is extended in the up-and-down directions as the piston 14 descends. When the PCM 48 controls the injector 28 and the fuel supply system 38 to inject the fuel from the injector 28 at this timing, the fuel is injected toward an area near an upper end of the tumble flow T. Near the upper end of the tumble flow T, a positive direction of the tumble flow T is oriented toward the exhaust ports 20 from the intake ports 18, i.e., away from the injector 28. Therefore, the fuel is injected by the injector 28 to the same direction as the positive direction of the flow near the upper end of the tumble flow T, which strengthens the tumble flow T. Thus, turbulence of the flow of the mixture gas within the combustion chamber 16 can be maintained until the ignition timing, and as a result, a flame propagation speed can be improved and homogeneous combustion can be obtained.

Then, at the compression-stroke-early-half injection timing in the cold state after the catalyst prompt warm-up state, as illustrated in FIG. 12, the tumble flow T generated on the intake stroke shifts in the vortex shape between the ceiling 26 of the combustion chamber 16 and the crown surface 50 while being compressed in the up-and-down directions as the piston 14 elevates. Particularly, a lower section of the tumble flow T is oriented obliquely upward and toward the injector 28 along the anti-injector-side inclined surface 54 of the crown surface 50.

Between 160 and 110 [deg BTDC] corresponding to the compression-stroke-early-half injection timing, similar to the compression-stroke-early-half injection timing in the catalyst prompt warm-up state, the range A of the center axis O of the combustion chamber 16 intersecting with the extension of the injection range of the fuel injected by the injector 28 at the predetermined spread angle β is located above the position of the center axis O intersecting with the extension plane P of the anti-injector-side inclined surface 54 of the crown surface 50.

Therefore, when the PCM 48 controls the injector 28 and the fuel supply system 38 to inject the fuel from the injector 28 at the compression-stroke-early-half injection timing, the fuel is injected toward a vortex center of the tumble flow T, at a position above the lower section of the tumble flow T oriented obliquely upward and toward the injector 28 along the anti-injector-side inclined surface 54 of the crown surface 50.

In this case, the penetration of the fuel in its injection direction is suppressed by a kinetic energy of the tumble flow T oriented in a direction perpendicular to the injection direction of the fuel. Thus, the fuel does not penetrate the tumble flow T and the fuel adhesion to a wall surface of the combustion chamber 16 is suppressed.

Further, the timing at which the PCM 48 controls the injector 28 to inject the fuel is designed earlier as the inclination angle θ of the anti-injector-side inclined surface 54 becomes larger, that is, an upward angle at which the lower section of the tumble flow T is oriented along the anti-injector-side inclined surface 54 becomes larger and the vortex center of the tumble flow T shifts upward of the combustion chamber 16. In other words, regardless of the inclination angle θ of the anti-injector-side inclined surface 54, the fuel injected by the injector 28 at the compression-stroke-early-half injection timing is oriented toward the vortex center of the tumble flow T.

A rich area of the fuel formed within part of the tumble flow T by the fuel injection at the compression-stroke-early-half injection timing shifts in position in the vortex shape within the combustion chamber 16 along the tumble flow T. Then upon arrival of the ignition timing, as illustrated in FIG. 13, the rich area is formed around the tip of the ignition plug 32. Thus, the combustion stability can be improved and, even in the cold state in which the combustion tends to be unstable, the combustion stability can be secured.

As described above, in the cold state after the catalyst prompt warm-up state, the PCM 48 splits the fuel injection timing into the three timings of the intake-stroke-early-half injection timing, the intake-stroke-latter-half injection timing, and the compression-stroke-early-half injection timing, and controls the injector 28 to inject the fuel so that the ratio of the fuel injection amounts at the respective injection timings becomes 3.4:3.3:3.3 (intake-stroke-early-half injection timing: intake-stroke-latter-half injection timing: compression-stroke-early-half injection timing).

Specifically, the fuel is uniformly distributed inside the combustion chamber 16 by the fuel injections at the intake-stroke-early-half injection timing and the intake-stroke-latter-half injection timing so as to improve the emission performance, and the rich area is formed around the ignition plug 32 at the ignition timing before the CTDC by the fuel injection at the compression-stroke-early-half injection timing so as to improve the combustion stability. Particularly, by splitting the fuel injection timing into the three timings of the intake-stroke-early-half injection timing, the intake-stroke-latter-half injection timing, and the compression-stroke-early-half injection timing, the fuel injection amount at the compression-stroke-early-half injection timing is reduced to suppress the fuel adhesion to the crown surface 50 and the wall surface of the combustion chamber 16.

Next, modifications of this embodiment are described.

In the embodiment described above, the two independent intake ports 18 and the two independent exhaust ports 20 are formed in the cylinder head 6 for each of the cylinders 2; however, the numbers of the intake and exhaust ports 18 and 20 may respectively be different.

In the embodiment described above, the PCM 48 determines the operating state of the engine 1 based on the detection signals received from the catalyst temperature sensor 46, the fluid temperature sensor, the crank angle sensor, the accelerator position sensor, etc.; however, the operating state of the engine 1 may be determined by using detection signal(s) received from other sensor(s).

In the embodiment described above, the total fuel injection amount in one cycle is designed so that the mixture gas becomes lean as a whole, which is thinner than the theoretical air-fuel ratio; however, it may be designed so that the ratio of the mixture gas becomes substantially the same as the theoretical air-fuel ratio as a whole.

Next, operations and effects of the control system of the engine 1 of the embodiment and the modifications thereof described above are described.

In the catalyst prompt warm-up state, the PCM 48 controls the injector 28 to inject the fuel at the intake-stroke injection timing, the compression-stroke-early-half injection timing, and the compression-stroke-latter-half injection timing. At the compression-stroke-early-half injection timing, since the fuel is injected from the injector 28 toward the vortex center of the tumble flow T, the penetration of the fuel in its injection direction is suppressed by the kinetic energy of the tumble flow T oriented in the direction perpendicular to the injection direction of the fuel. Thus, the rich area can be formed within the tumble flow T without the fuel penetrating the tumble flow T and adhering to the crown surface 50 and the wall surface of the combustion chamber 16. Further, the rich area is shifted in position along the tumble flow T and, by the fuel injection at the compression-stroke-latter-half injection timing, pushed toward the ignition plug 32. Thus, at the ignition timing designed to be after the CTDC, the rich area can be formed around the tip of the ignition plug 32 with the fuel injected at the compression-stroke-latter-half injection timing, and as a result, the combustion stability can be improved. Moreover, by splitting the fuel injection timing on the compression stroke into the compression-stroke-early-half injection timing and the compression-stroke-latter-half injection timing, the fuel injection amount at the compression-stroke-latter-half injection timing is reduced, and thus, the fuel adhesion to the crown surface 50 can be suppressed. Therefore, even when the ignition timing is designed to be after the CTDC, the combustion stability can be improved while suppressing the adhesion of fuel to the crown surface 50 and the wall surface of the combustion chamber 16 to prevent the degradation of the emission performance.

The crown surface 50 of the engine 1 is formed with the anti-injector-side inclined surface 54 extending obliquely upward and toward the injector 28 from the end portion of the crown surface 50 which is on the opposite side from the injector 28. Therefore, the tumble flow T oriented obliquely upward and toward the injector 28 can be generated along the anti-injector-side inclined surface 54 of the crown surface 50, and the fuel can surely be injected toward the vortex center of the tumble flow T by the injector 28. Thus, the rich area can be formed within the tumble flow T without the fuel penetrating the tumble flow T and adhering to the crown surface 50 and the wall surface of the combustion chamber 16, and at the ignition timing designed to be after the CTDC, the rich area can be formed around the tip of the ignition plug 32 with the fuel injected at the compression-stroke-latter-half injection timing, and as a result, the combustion stability can be improved.

Particularly, the PCM 48 controls the injector 28 to inject the fuel at the compression-stroke-early-half injection timing designed to be the timing at which the range A of the center axis O of the combustion chamber 16 intersecting with the extension of the injection range of the fuel injected by the injector 28 at the predetermined spread angle β is located above the position of the center axis O intersecting with the extension plane P of the anti-injector-side inclined surface 54 of the crown surface 50. Therefore, the fuel can surely be injected toward the vortex center of the tumble flow T, at the position above the lower section of the tumble flow T oriented obliquely upward and toward the injector 28 along the anti-injector-side inclined surface 54 of the crown surface 50. Thus, the rich area can be formed within the tumble flow T without the fuel penetrating the tumble flow T and adhering to the crown surface 50 and the wall surface of the combustion chamber 16, and at the ignition timing designed to be after the CTDC, the rich area can be formed around the tip of the ignition plug 32 with the fuel injected at the compression-stroke-latter-half injection timing, and as a result, the combustion stability can be improved.

The PCM 48 controls the injector 28 to inject the fuel at the compression-stroke-early-half injection timing designed to be between 160 and 110 degrees before the CTDC. Therefore, the fuel can surely be injected toward the vortex center of the tumble flow T. Thus, the rich area can be formed within the tumble flow T without the fuel penetrating the tumble flow T and adhering to the crown surface 50 and the wall surface of the combustion chamber 16, and at the ignition timing designed to be after the CTDC, the rich area can be formed around the tip of the ignition plug 32 with the fuel injected at the compression-stroke-latter-half injection timing, and as a result, the combustion stability can be improved.

In the cold state after the catalyst prompt warm-up state, the PCM 48 designs the ignition timing to be before the CTDC and controls the injector 28 to inject the fuel at the intake-stroke-early-half injection timing, the intake-stroke-latter-half injection timing, and the compression-stroke-early-half injection timing. Therefore, the fuel injection amount at the compression-stroke-early-half injection timing is reduced, and the fuel adhesion to the crown surface 50 and the wall surface of the combustion chamber 16 can be suppressed. Further, by injecting the fuel at the compression-stroke-early-half injection timing, the rich area with the fuel can be formed within the tumble flow T. Moreover, by shifting the rich area along the tumble flow T, the rich area can be formed around the tip of the ignition plug 32 at the ignition timing designed to be before the CTDC, and the combustion stability can be improved. Furthermore, by uniformly distributing the fuel inside the combustion chamber 16 by the fuel injections at the intake-stroke-early-half injection timing and the intake-stroke-latter-half injection timing, the emission performance can be improved.

When the temperature of the exhaust gas is low and the temperature of the catalyst has not reached the activating temperature, which is the case, for example, immediately after the cold start of the engine 1, the PCM 48 retards the ignition timing to after the CTDC. Therefore, high-temperature exhaust gas flows into the catalyst and the temperature of the catalyst can promptly be increased. Thus, the purifying performance of the exhaust gas can be secured from immediately after the cold start of the engine 1 while suppressing the adhesion of fuel to the crown surface 50 and the wall surface of the combustion chamber 16 to prevent the degradation of the emission performance, and improving the combustion stability.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine
2 Cylinder
14 Piston
16 Combustion Chamber
18 Intake Port

20 Exhaust Port
26 Ceiling
28 Injector
30 Nozzle Hole
32 Ignition Plug
44 Catalyst Converter
48 PCM
50 Crown Surface
54 Anti-injector-side Inclined Surface
T Tumble Flow

What is claimed is:

1. A control system of an engine, the control system controlling, by using a tumble flow, a behavior of fuel that is directly injected into a combustion chamber formed inside a cylinder of the engine, the control system comprising:
    a fuel injector for directly injecting the fuel into the combustion chamber;
    an intake port configured to generate the tumble flow within the combustion chamber; and
    a processor configured to:
        control an ignition plug of the engine to ignite after a top dead center on compression stroke of the cylinder in a cold state of the engine; and
        control the fuel injector to inject the fuel in a three-stage injection at an intake-stroke injection timing designed to be on intake stroke of the cylinder, a compression-stroke-early-half injection timing designed to be in an early half of the compression stroke, and a compression-stroke-latter-half injection timing designed to be in a latter half of the compression stroke,
    wherein the processor controls the fuel injector to inject the fuel toward a vortex center of the tumble flow above an anti-injector-side inclined surface of a crown surface of the combustion chamber at the compression-stroke-early-half injection timing.

2. The control system of claim 1,
    wherein the ignition plug of the engine is provided in a center portion of a ceiling of the combustion chamber,
    wherein the fuel injector is disposed at a position of a circumferential edge portion of the ceiling of the combustion chamber on a side where the intake port is provided, and injects the fuel obliquely downward and toward an opposite side from the intake port, and
    wherein the engine has a piston having a crown surface, and the crown surface is formed with an inclined surface extending obliquely upward and toward the side where the fuel injector is provided, from an end portion of the crown surface on an opposite side from the fuel injector.

3. The control system of claim 2, wherein the compression-stroke-early-half injection timing is designed to be a timing at which a range of a center axis of the combustion chamber intersecting with an extension of an injection range of the fuel injected by the fuel injector at a predetermined spread angle is located above a position of the center axis intersecting with an extension plane of the inclined surface of the crown surface.

4. The control system of claim 3, wherein the compression-stroke-early-half injection timing is designed to be between 160 and 110 degrees before the top dead center of the compression stroke.

* * * * *